United States Patent [19]

Romagnoli, Jr.

[11] Patent Number: 5,979,838
[45] Date of Patent: Nov. 9, 1999

[54] SEISMIC CABLE MODULE CLAMP SYSTEM

[75] Inventor: Richard Peter Romagnoli, Jr., Humble, Tex.

[73] Assignee: Western Atlas International, Inc., Houston, Tex.

[21] Appl. No.: 08/791,592

[22] Filed: Jan. 31, 1997

[51] Int. Cl.$^6$ ........................................ F16L 1/12
[52] U.S. Cl. ...................... 248/62; 248/685; 248/686; 285/23; 405/158
[58] Field of Search .................. 248/62, 63, 74.1, 248/70, 316.5, 291.1, 316.6, 74.4, 64, 74.2, 685, 686, 689, 682, 58, 61; 285/61, 62, 23; 441/133, 134; 174/79; 405/165, 158, 154

[56] References Cited

U.S. PATENT DOCUMENTS

| | | | |
|---|---|---|---|
| 888,896 | 5/1908 | Howard | 248/685 |
| 1,773,838 | 8/1930 | Zifferer | 248/62 |
| 2,510,812 | 6/1950 | Garland et al. | 248/685 |
| 2,988,841 | 6/1961 | Seufert et al. | 248/686 |
| 3,240,870 | 3/1966 | Harmon | 248/63 X |
| 3,259,086 | 7/1966 | Stein | 248/685 |
| 3,383,459 | 5/1968 | Short | 248/63 X |
| 3,664,620 | 5/1972 | Branum | 248/63 |
| 4,107,802 | 8/1978 | Patinet et al. | 441/133 |
| 4,143,844 | 3/1979 | Van Meter | 248/62 |
| 4,240,602 | 12/1980 | McDonald | 248/62 X |
| 4,445,657 | 5/1984 | Breckenridge | 248/74.1 X |
| 4,981,395 | 1/1991 | Datin et al. | 405/154 |
| 5,230,302 | 7/1993 | Steudler, Jr. | 248/58 X |
| 5,263,796 | 11/1993 | De Waal | 405/158 X |

FOREIGN PATENT DOCUMENTS

| | | | |
|---|---|---|---|
| 376640 | 6/1923 | Germany | 248/63 |
| 1504749 | 3/1978 | United Kingdom | 248/74.1 |
| WO 98/03885 | 7/1996 | WIPO . | |

*Primary Examiner*—Ramon O. Ramirez
*Assistant Examiner*—Stephen S. Wentsler

[57] ABSTRACT

An apparatus and method for retaining a seismic cable connector module to permit in-water repair of seismic cables. A clamp is supported by a vessel positioned over the submerged seismic cable. The seismic cable is raised above the water surface, and the clamp is attached to the exterior surface of the connector module. The clamp can include a lock for securing the connector module, and a swivel between the clamp and the vessel can permit movement of the connector module relative to the vessel as the vessel heaves due to wind and wave action. The clamp can release the connector module if the environmental forces acting on the connector module exceed a selected amount. The clamp can be attached to a separate vessel for in-water use or can be attached to the vessel deck. A clasp within the exterior surface of the connector module is detachably engagable with a clamp supported by the vessel.

6 Claims, 4 Drawing Sheets

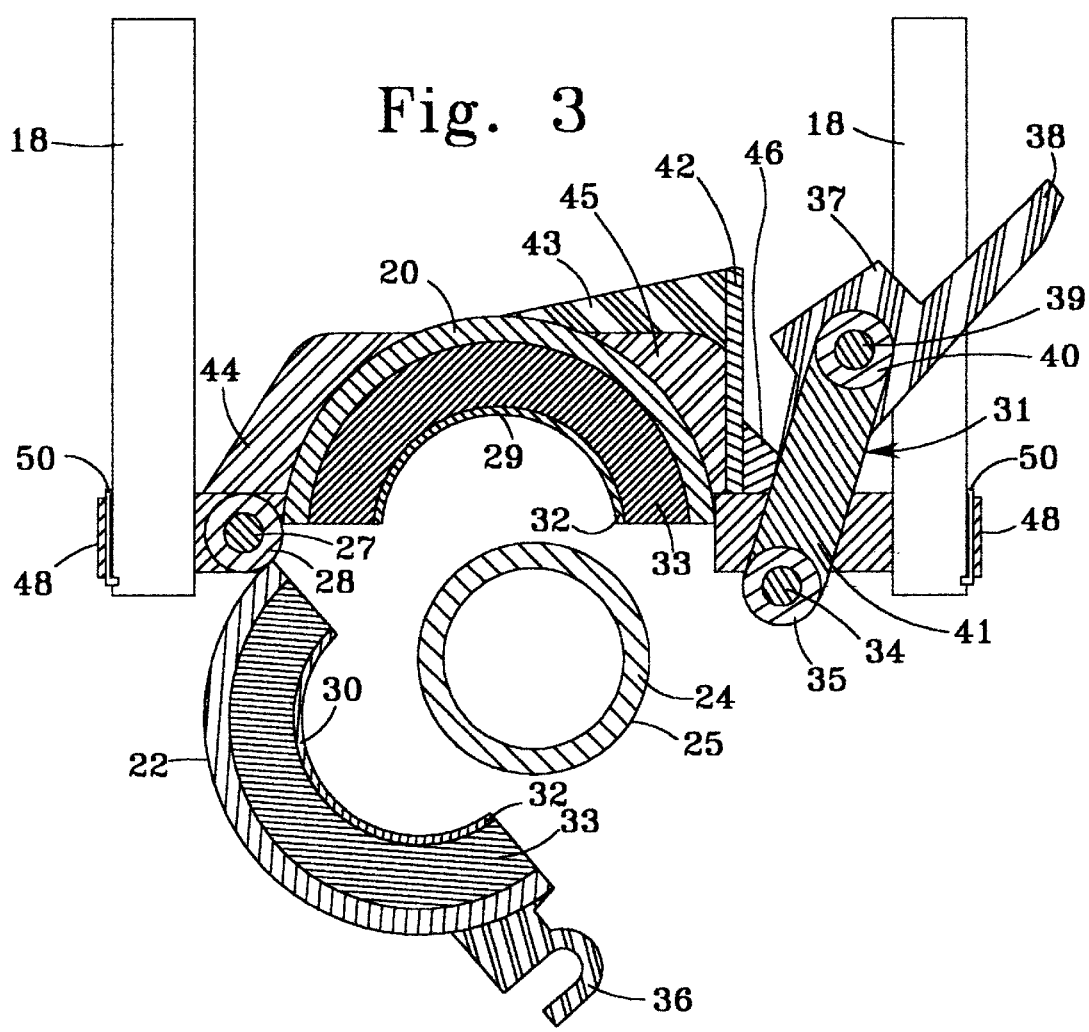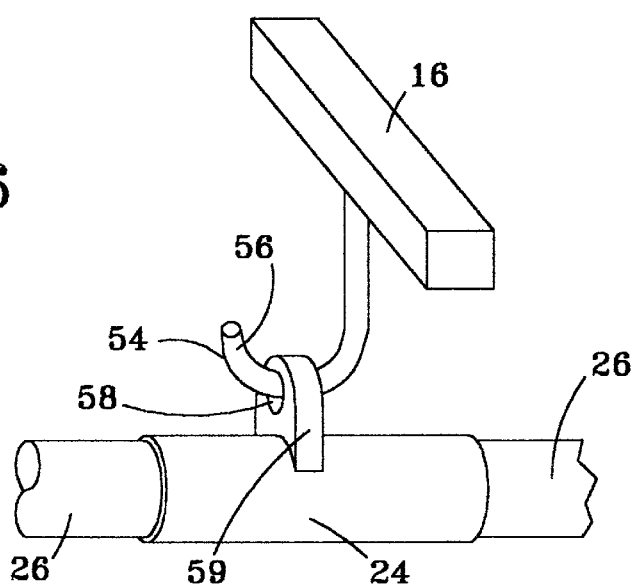

SEISMIC CABLE MODULE CLAMP SYSTEM

BACKGROUND OF THE INVENTION

The present invention relates to the field of seismic cable repair. More particularly, the present invention relates to an apparatus and method for facilitating in-water seismic cable repair at an offshore survey location.

Marine seismic cables known as streamers are towed behind seismic vessels to collect data related to subsurface geologic formations. The streamers typically include communication lines for transmitting signals, cable stress elements for providing strength, and hydrophones for detecting seismic waves reflected from the geologic formations.

Seismic cables are normally constructed by joining multiple cable sections with multiple connecting modules. Each cable section is typically one hundred meters long, and a streamer cable is typically 4000 to 8000 meters long. The connecting modules, constructed with titanium or stainless steel, provide a waterproof seal between adjacent cable sections. When a seismic cable section needs to be replaced because of damage or a failure, the cable section must be detached from adjacent connecting modules so that a new cable section can be installed.

Historically, marine seismic repair has been performed by stopping the tow vessel and by removing the entire streamer cable from the water. The streamers are retrieved onto the vessel deck, a new cable section is substituted for the damaged cable section, and the entire seismic cable is re-deployed into the water behind the tow vessel. Deck site repair is typically performed because of the difficulty and potential hazards of in-water seismic cable repairs.

Conventional deck site repair of seismic cables slows seismic operations and increases operation cost. Seismic cable repair causes significant down-time expense because the seismic operations necessarily cease during repair operations. The replacement of a single seismic cable section can require a number of days. Additionally, tow vessel movement and cable handling equipment can stretch and break seismic cables, thereby increasing the overall cost and delay of seismic cable repairs. Accordingly, a need exists for an improved apparatus and method for facilitating in-water repair of damaged seismic cable sections.

SUMMARY OF THE INVENTION

The present invention provides an apparatus and method for supporting a seismic cable connector module from a vessel in a body of water. A clamp is supported by the vessel for engaging the module and for retaining the module above the water surface to permit the detachment and reattachment of adjacent seismic cable sections. The clamp can be disengaged from the connector module to permit the deployment of the connector module into the water.

In one specific embodiment of the invention, the apparatus can comprise a first clamp section and a second clamp section each having inner surfaces for contacting the connector module, and a lock for selectively retaining the first and second clamp sections in contact with the connector module.

The method of the invention is practiced by providing a vessel at a position proximate to the connector module, by supporting a clamp above the water surface with the vessel, by raising the connector module into contact with the clamp, and by retaining the module with the clamp. An adjacent seismic cable section is detached from the connector module, a replacement seismic cable section is attached to the connector module, and the connector module is re-deployed into the water.

BRIEF DESCRIPTION OF THE DRAWINGS

FIG. 3 illustrates a partial sectional view of the FIG. 2 embodiment before the module is engaged by the clamp.

FIG. 6 illustrates an elevation view of an alternative embodiment of invention.

DESCRIPTION OF THE PREFERRED EMBODIMENTS

The present invention provides an apparatus and method for permitting in-water repair and replacement of marine seismic cable sections.

Figure 1:
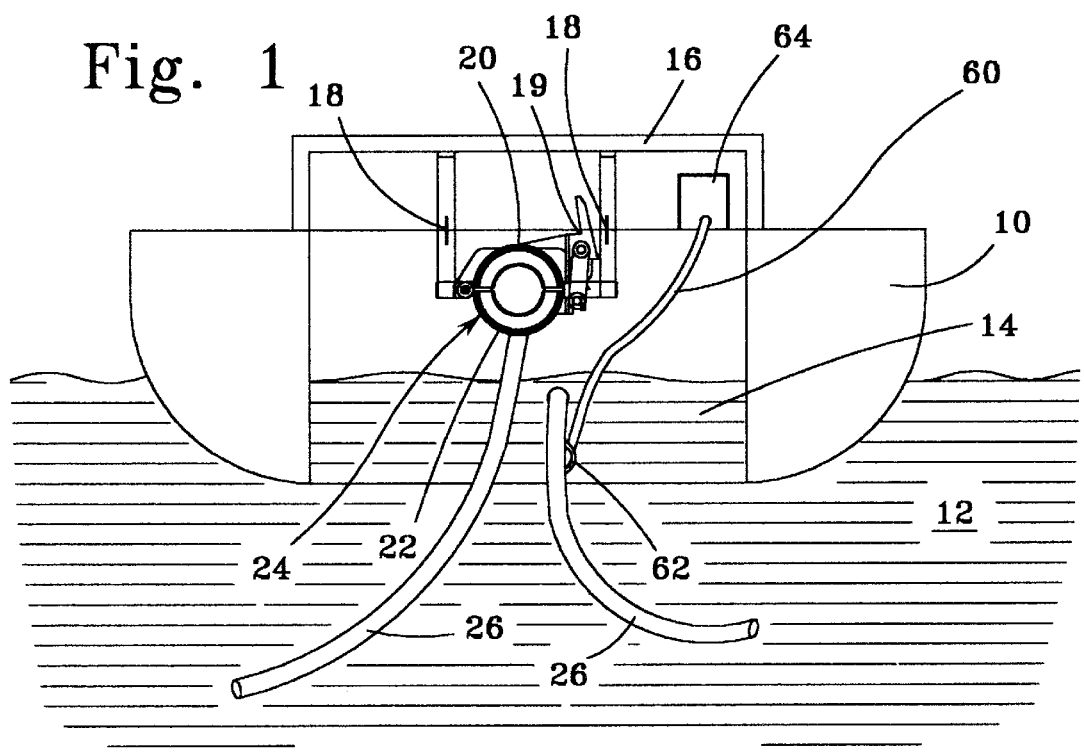
FIG. 1 illustrates the invention positioned adjacent to a moon pool a floating vessel.

FIG. 1 shows work boat or vessel 10 floating in water 12. When not in use, vessel 10 can be towed or carried by a seismic tow vessel (not shown) which tows the seismic streamer cable or cables. Vessel 10 includes moon pool 14 which comprises an open bay for permitting access to water 12 from an interior section of vessel 10. Brace 16 is positioned above moon pool 14 and includes vertical brackets 18. Clamp 19 includes first clamp section 20 and second clamp section 22 which are engaged with brace 16 for retaining seismic cable connector module 24.

Module 24 has exterior surface 25 for contacting clamp 19 as described below. Module 24 provides a connector for linking adjacent seismic cable sections 26 and the individual communication lines and other interior components (not shown) which form a seismic cable and fully assembled streamer. Module 24 can be formed in different shapes and sizes depending on the configuration and character of cable sections 26. Module 24 can comprise an integral portion of a cable section 26 or can comprise a discrete connector for linking adjacent cable sections 26. As used herein, the terms "module" or "connector module" are defined as any discrete apparatus for connecting the ends of two seismic cable sections 26, and are further defined as an apparatus where a connection end is integrally formed within one end of a cable section 26. Module 24 typically includes electronic components (not shown) for processing, transmitting and storing seismic data. Exterior surface 25 of module 24 can comprise a cylindrical shaped member having a smooth exterior surface, but can also be formed in other configurations as described below. Module 24 can be constructed from stainless steel, titanium or another metallic material, from a composite material, or from another material type suitable for providing a watertight connection between adjacent cable sections 26 and a strong housing for the interior electronic components.

Figure 2:
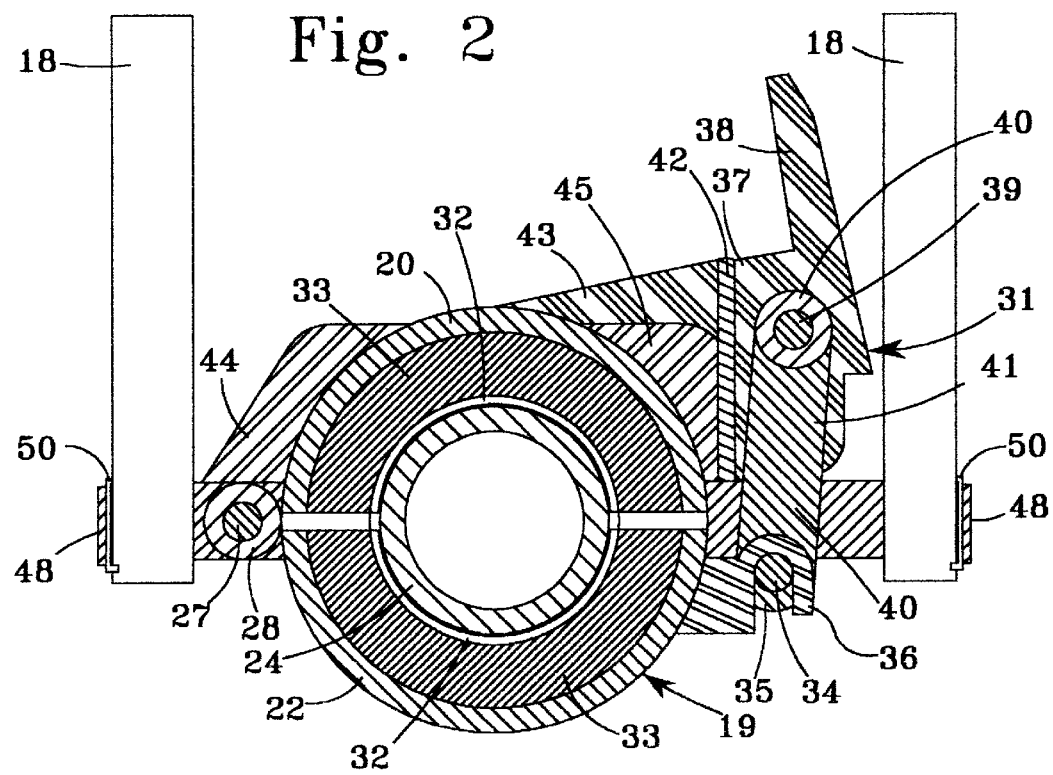
FIG. 2 illustrates a partial sectional view for one embodiment of the invention.

Referring to FIGS. 2 and 3, first clamp section 20 and second clamp section 22 are connected with hinge pins 27 supported by bearings 28. First clamp section 20 has inner surface 29 for contacting exterior surface 25 of module 24. In the preferred embodiment illustrated in FIGS. 2 and 3, first clamp section 20 is illustrated as a cylindrical section having a semicircular, arcuate interior surface 29 for engaging exterior surface 25. Similarly, second clamp section 22 has semicircular, arcuate inner surface 30 for engaging module exterior surface 25. Lock mechanism 31 retains first clamp section 20 and second clamp section 22 in contact with module exterior surface 25. The operation of lock mechanism 31 is more thoroughly described below.

In one embodiment of the invention, a resilient material 32 of a natural or synthetic material can be attached to inner surfaces 29 and 30 each of the first and second clamp sections 20 and 22. Material 32 provides a surface resistant to slippage, and can have a smooth or textured exterior to perform the functions of gripping module exterior surface 25 and of providing a cushion between clamp 19 and module 24. In another embodiment of the invention, a bearing such as split bearing 33 can be positioned between resilient material 32 and inner surfaces 29 and 30. Bearing 33 can be constructed from bronze, elastomer or other material to provide a strong backing material for resilient material 32. Bearing 33 can be attached to resilient material 32 with rivets, adhesives or other fastening devices and provides a composite structure within clamp 19 which provides a high degree of gripping power for module 24.

In one embodiment of the invention, lock mechanism 31 can comprise a Protex 70-1273 over-center fastener or another commercially available fastening device suitable for retaining module 24. Lock mechanism 31 can be configured in many different ways to accomplish the function of retaining first clamp section 20 and second clamp section 22 in contact with module exterior surface 25. As shown in FIGS. 2 and 3, lock mechanism 31 can include pin 34 supported with bearing 35 for engaging hook 36. When module 24 is positioned between first clamp section 20 and second clamp section 22 as shown in FIG. 3, hook 36 engages pin 34 to compress module 24 within first clamp section 20 and second clamp section 22 as shown in FIG. 2. Clasp 37 permits a selected clamping force to be exerted by first clamp section 20 and second clamp section 22 against module 24 sufficient to retain module 24 in a fixed position relative to vessel 10. Clasp 37 has rotatable lever arm 38 connected by pin 39 and bearing 40 to connecting arm 41. Pin 34 is further engaged with connecting arm 41 to provide a mechanical connection between lever arm 38 and pin 34.

As shown in FIG. 3, lever arm 38 can be lowered to lengthen clasp 37 so that hook 36 engages pin 34. Lever arm 38 is moved upwardly to raise connecting arm 41, pin 34, and hook 36 until inner surface 30 contacts module exterior surface 25. When lever arm 38 is moved into the final engaged position shown in FIG. 2, clasp 37 cooperates with latch 42 to retain module 24 relative to clamp 19. Latch 42 can comprise any device suitable for retaining lever arm 38. Ribs 43 support latch 42, and ribs 44 and 46 provide other structural support for clamp 19. To release module 24 from contact with clamp 19, lever arm 38 is disconnected from latch 42 and lever arm 38 is lowered until pin 34 can be detached from engagement with hook 36. Second clamp section 22 rotates about pin 27 and module 24 is released from engagement between first clamp section 20 and second clamp section 22 so that module 24 and attached cable section ends 26 can be lowered into water 12.

In a preferred embodiment of the invention, an automatic lock and release mechanism can be substituted for lock mechanism 31. Such lock and release mechanism could automatically release module 24 from contact with first clamp section 20 and second clamp section 22 when a force of a selected magnitude acts against module 24, or in response to an operator generated control signal. Such a feature would automatically disengage module 24 from vessel 10 when an unusually large environmental loading force induced by wind or wave action acts against vessel 10 or cable sections 26. This disconnect feature of the invention would resist damage to cable sections 26, connector module 24, and other components in the event of an extraordinary condition, and would provide an automatic quick release mechanism when a load is exerted against module 24. In one embodiment of the invention, the quick release feature can merely loosen the grip between module 24, first clamp section 20, and second clamp section 22 without fully releasing module 24 into the water. In another embodiment of the invention, the quick release feature could completely release module 24 and attached cable sections 26 from engagement with vessel 10.

Figure 4:
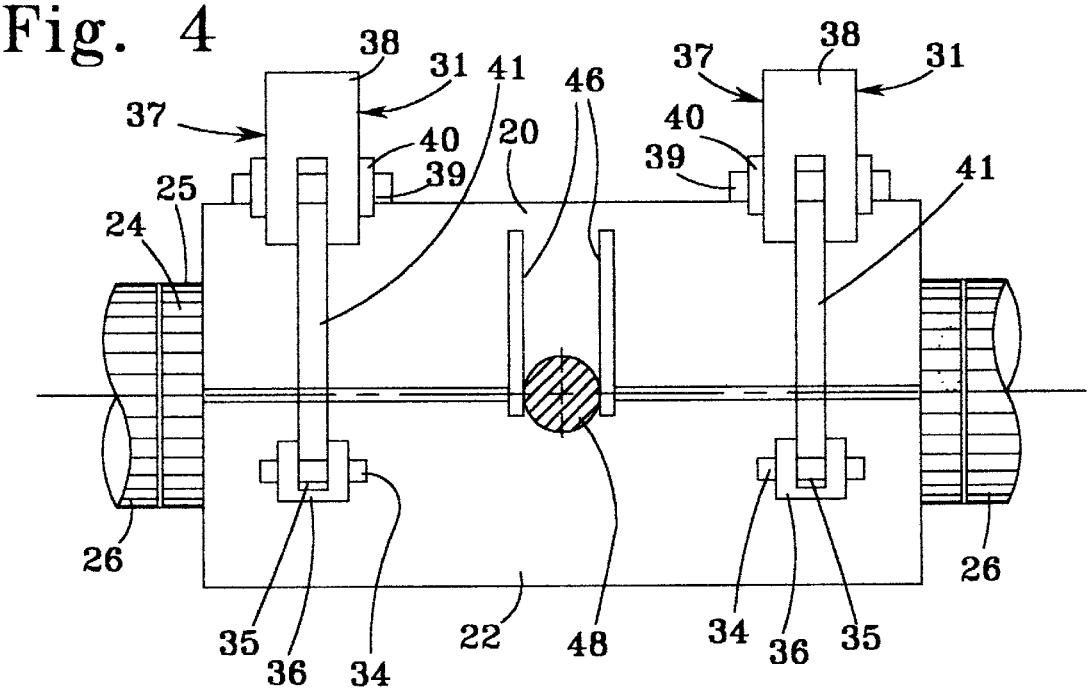
FIG. 4 illustrates a side elevation view of the embodiment shown in FIG 2.
Figure 5:
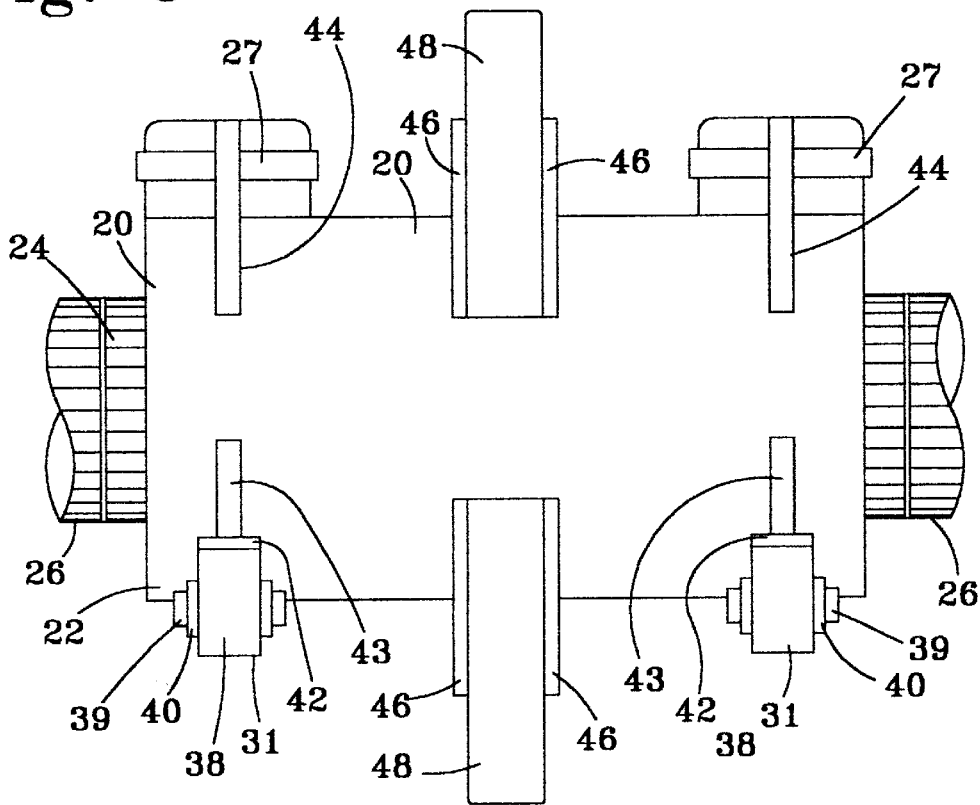
FIG. 5 illustrates a plan view of the embodiment shown in FIG. 2.

As shown in FIGS. 4 and 5, pins 48 extend perpendicular to the longitudinal axis through first clamp section 20. As shown in FIG. 2, pins 48 are secured within bearings 50 attached to vertical brackets 18, and provide a swivel or pivot between vessel 10 and first clamp section 20 or second clamp section 22. When module 24 and attached cable sections 26 are retained by first clamp section 20 and second clamp section 22, pins 48 permit rotation or pivotal movement of module 24 relative to vessel 10, thereby providing an axis of movement accommodating heave and other movement of vessel 10 relative to cable sections 26. Such pivotal movement reduces the stresses between module 24 and cable sections 26, and between module 24 and vessel 10. Pins 48 also facilitate the attachment between module 24, first clamp section 20, and second clamp section 22 by permitting relative movement therebetween as lock 34 retains module 24. Swivels such as pins 48 provide simple relative movement between such components, and universal joints and other devices could replace pins 48 to accommodate complex relative movements and to reduce stress between module 24 and vessel 10.

As illustrated in FIGS. 3 and 5, pins 27 can connect second clamp section 22 to first clamp section 20 to provide relative movement therebetween. The release of lock 34 will cause the free end of second clamp section 22 to pivot about pins 27 relative to first clamp section 20, thereby releasing module 24 from engagement with first clamp section 20 and second clamp section 22.

FIG. 6 illustrates another embodiment of the invention wherein another type of clamp such as hook 54 is attached to brace 16. Hook inner surface 56 is engaged with aperture 58 through extension 59 of module 24. Extension 59 can form an integral part of module 24 or can be attached to exterior surface 25 as shown in FIG. 6. In this embodiment of the invention, hook 54 functions both as the clamp and as the lock mechanism described above, and performs the multiple functions of engaging module 24 to support module 24 above water 12, of selectively retaining hook 54 in contact with module 24, and of selectively permitting the release of module 24 from contact with hook 54. In this embodiment of the invention, the engagement of hook inner surface 56 with aperture 58 further permits pivotal movement of module 24 relative to hook 54 and vessel 10. Alternatively, the engagement between the clamp and module connections could be reversed so that hook 54 is attached to module 24, and aperture 58 is attached to vessel 10.

Figure 7:
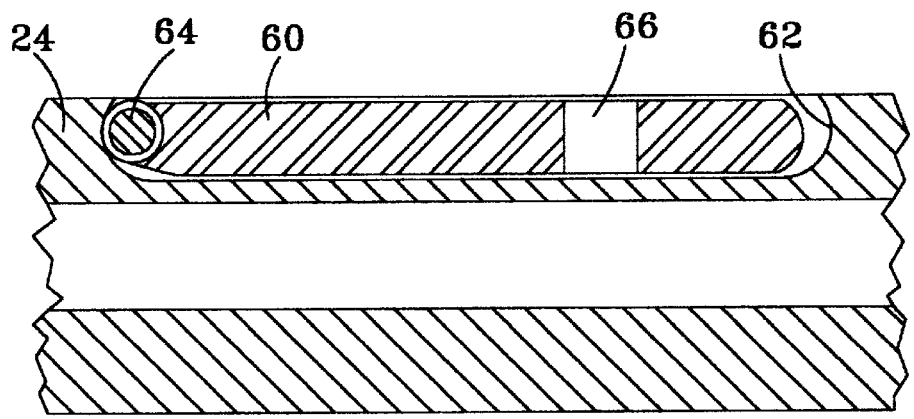
FIG. 7 illustrates an elevation view of a clamp engaged with a connector module having a retractable arm.
Figure 8:
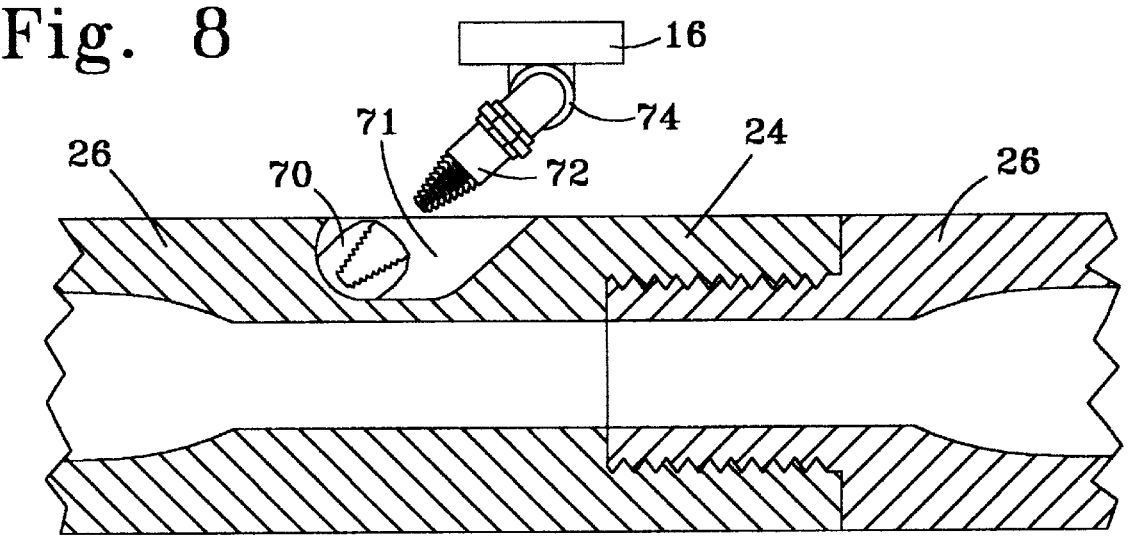
FIG. 8 illustrates an elevation view of a clamp engaged with a connector module having a clasp.

Different configurations and constructions of a clamp and module can be made to accomplish the function and benefits provided by the invention. FIGS. 7 and 8 illustrate alternative embodiments of the invention showing different clamp configurations adaptable to different forms of connector modules 24. FIG. 7 shows arm 60 which is retracted within recess 62 of connector module 24. Arm 60 is pivotal about hinge 64, and is normally recessed within recess 62 to reduce friction and seismic signal noise as module 24 is towed through water 12. Arm 60 can be pivoted or otherwise moved to extend outwardly from recess 62 to facilitate engagement of arm 60 with clamp 19. In one embodiment, aperture 66 can extend through retractable arm 60 for engagement with a clamp such as hook 54.

In an alternative embodiment of the invention, connector module 24 can incorporate a mechanism such as clasp 70 which can be selectively extendible outside of the space defined by the exterior surface of module 24, or can be fully contained within recess 71 as shown in FIG. 8. Clasp 70 can comprise a quick disconnect mechanism suitable for engagement with clamp 72, or can comprise a structure suitable for selective engagement with a gripping mechanism generally illustrated as clamp 72. Clamp 72 can be attached to swivel 74 to provide relative movement relative to brace 16. Although module 24 as shown in FIG. 8 is integrated within one end of seismic cable section 26 to form a threaded connection between adjacent cable sections 26, module 24 could comprise a separate, detachable device as previously described.

In operation, the invention is practiced by providing vessel 10 at a position proximate to module 24. Cable sections 26 and attached module 24 can be located visually or with cable sensing equipment. Module 24 is raised above water 12 manually, with hydraulic arms, or with conventional hoisting tools and techniques until module 24 is positioned between inner surfaces 29 and 30 as shown in FIG. 3. Subsequently, clamp 19 is operated to engage module 24 as shown in FIG. 2. When module 24 contacts inner surface 29, second clamp section 22 is closed until inner surface 30 contacts module 24 and lock mechanism 31 is operated to retain module 24 in a fixed position relative to first clamp section 20 and second clamp section 22. For the inventive embodiments illustrated in FIGS. 6 and 7, module 24 is raised until hook 54 can be inserted through aperture 58 or through aperture 66. For the inventive embodiment illustrated in FIG. 8, module 24 is raised until clamp 72 can be engaged with clasp 70 of module 24. Module 24 is retained by the clamp at a position above the water surface in a preferred embodiment of the invention to facilitate repair work by maintenance personnel.

First clamp section 20 can be connected to a swivel such as pins 48 to permit movement of first clamp section 20 relative to vessel 10. Second clamp section 22 can be pivoted about hinges 52 to selectively open and close second clamp section 22 relative to first clamp section 20, or can be attached and detached in other ways consistent with the particular construction of the clamp and lock elements.

After module 24 is secured, a line or cable 80 can be attached to clamp point 82 of cable section 26 which is to be removed from the cable, and the corresponding end of this cable section 26 can be disconnected from module 24. The cable section 26 can be reeled into vessel 10 with spool 84, and the end of a new cable section 26 can be attached to module 24. Module 24 and the corresponding repaired cable streamer can then be redeployed into water 12. The other end of the cable section to be replaced is then detached from the module connecting this cable section to the cable, and the replacement cable section is connected to the connector module instead.

The present invention provides a unique apparatus and method for in-water marine repair and maintenance of seismic cable sections. Numerous changes in the shape and configuration of the components can be made to the invention without departing from the scope of the inventive concepts disclosed herein. For example, first clamp section 20 and second clamp section 22 are illustrated as forming a cylindrical inner surface which conforms to the exterior cylindrical surface 25 of module 24, however the shape of such inner surface can vary with differing shapes, sizes and configurations of module 24. Although the cylindrical clamping apparatus in FIGS. 2–5 distributes the clamping forces evenly across exterior surface 30 of module 24, mechanical configurations shown in FIGS. 6–8 and other possible structural and mechanical configurations could accomplish the same functional result of retaining module 24 in a stable position relative to vessel 10 so that cable sections 26 can be repaired or replaced. Instead of a compressive force, the invention can alternatively retain module 24 with clasps, hooks, connectors, locks or other structural or mechanical devices which function as a "clamp".

The invention facilitates the safe handling of seismic cable sections 26 in the water, reduces the amount of hand labor required to handle cable sections 26, and reduces the risk of injury to maintenance personnel. The invention facilitates cable section 26 replacement anywhere within a single streamer or within a multiple streamer configuration.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A method for retaining a seismic cable connector module above a body of water surface when the connector module connects adjacent seismic cable sections, comprising the steps of:

providing a vessel proximate to the connector module;

supporting a clamp with the vessel;

raising the connector module into contact with said clamp;

retaining the connector module with said clamp at a location above the water surface;

detaching one adjacent seismic cable section from the connector module;

attaching a seismic cable section end of a different seismic cable section to the connector module; and deploying the connector module and attached seismic cable sections into the water.

2. A method for retaining a seismic cable connector module and connected seismic cable sections above a water surface, comprising the steps of:

providing a floating vessel proximate to the connector module, wherein the connector module has a clasp within a space defined by the exterior surface of the connector module;

supporting a clamp with the vessel;

raising the connector module and clasp to a location above the water surface;

attaching said clamp to the clasp;

detaching one adjacent seismic cable section from the connector module;

attaching a seismic cable section end to the connector module; and deploying the connector module and connected seismic sections into the water.

3. A method as recited in claim 2, further comprising the step of attaching said clamp to a swivel to permit movement of said clamp relative to the vessel.

4. A method as recited in claim 2, further comprising the step of securing the detached cable section to the vessel before the seismic cable section is detached from the connector module.

5. A method as recited in claim 4, further comprising the steps of retrieving the detached cable section until a second connector module attached to the detached cable section is raised above the water surface, of retaining the second connector module above the water surface, of disconnecting the detached cable section from the second connector module, and of attaching a new seismic cable section to the connector module and to the second connector module.

6. A method as recited in claim 2, wherein said clamp releases the connector module when a selected force acts against the connector module.

* * * * *